(12) United States Patent
Gerges et al.

(10) Patent No.: US 11,537,789 B2
(45) Date of Patent: Dec. 27, 2022

(54) SYSTEMS AND METHODS FOR SEAMLESS APPLICATION OF AUTOCORRECTION AND PROVISION OF REVIEW INSIGHTS THROUGH ADAPTED USER INTERFACE

(71) Applicant: Microsoft Technology Licensing, LLC, Redmond, WA (US)

(72) Inventors: Hany Grees Gerges, Bothell, WA (US); Olivier Gauthier, Duvall, WA (US); Kaushik Ramaiah Narayanan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/420,857

(22) Filed: May 23, 2019

(65) Prior Publication Data
US 2020/0372105 A1 Nov. 26, 2020

(51) Int. Cl.
*G06F 40/232* (2020.01)
*G06F 40/166* (2020.01)

(52) U.S. Cl.
CPC .......... *G06F 40/232* (2020.01); *G06F 40/166* (2020.01)

(58) Field of Classification Search
CPC ............................. G06F 40/232; G06F 40/166
(Continued)

(56) References Cited

U.S. PATENT DOCUMENTS

| 5,576,955 A | 11/1996 | Newbold et al. |
| 5,940,847 A | 8/1999 | Fein et al. |

(Continued)

FOREIGN PATENT DOCUMENTS

| DE | 102010027146 A1 | 1/2012 | |
| WO | 2006035402 A1 | 4/2006 | |
| WO | WO-2012076742 A1 * | 6/2012 | ......... G06F 3/04886 |

OTHER PUBLICATIONS

"Dale-Chall Readability Formula", Retrieved From: https://en.wikipedia.org/wiki/Dale%E2%80%93Chall_readability_formula, Retrieved Date: Nov. 12, 2020, 2 Pages.
(Continued)

*Primary Examiner* — Pierre Louis Desir
*Assistant Examiner* — Nicole A K Schmieder

(57) ABSTRACT

The present disclosure relates to processing operations configured to provide, through an adapted user interface of an application/service, seamless application of autocorrection for an electronic document and provision of review insights into the autocorrections. In addition to applying autocorrections, processing described herein selectively determines when to apply an autocorrection (e.g., while a user is entering an input or after) and further highlights autocorrections, through a user interface, in a manner that instantly lets a user know that an autocorrection has occurred and/or what type of autocorrection is being applied. Moreover, an adapted user interface provides user interface features than enable access to an intelligent user interface menu that provides a user with feedback mechanisms to better understand the types of autocorrections that were made to their electronic document as well as improve processing efficiency for reversing an autocorrection and/or making further autocorrection changes to an electronic document.

20 Claims, 11 Drawing Sheets

(58) Field of Classification Search
USPC .......................................................... 704/9
See application file for complete search history.

(56) References Cited

U.S. PATENT DOCUMENTS

| | | | |
|---|---|---|---|
| 6,047,300 A | 4/2000 | Walfish et al. | |
| 6,167,368 A | 12/2000 | Wacholder | |
| 6,583,798 B1* | 6/2003 | Hoek .................... | G06F 40/166 |
| | | | 715/822 |
| 7,136,877 B2 | 11/2006 | Volcani et al. | |
| 9,218,333 B2 | 12/2015 | Liensberger | |
| 9,292,621 B1* | 3/2016 | Roth ................. | G06F 16/90324 |
| 2004/0194036 A1 | 9/2004 | Wolska et al. | |
| 2011/0119623 A1 | 5/2011 | Kim | |
| 2011/0313757 A1 | 12/2011 | Hoover et al. | |
| 2013/0151956 A1* | 6/2013 | Allen .................... | G06F 40/232 |
| | | | 715/256 |
| 2014/0104175 A1 | 4/2014 | Ouyang et al. | |
| 2014/0227044 A1 | 8/2014 | Youngblood et al. | |
| 2014/0324883 A1 | 10/2014 | Deolalikar | |
| 2014/0337044 A1 | 11/2014 | Heinze | |
| 2014/0358519 A1 | 12/2014 | Mirkin et al. | |
| 2015/0199913 A1* | 7/2015 | Mayfield ................. | G09B 7/02 |
| | | | 434/353 |
| 2015/0347383 A1* | 12/2015 | Willmore ............. | G06F 40/274 |
| | | | 704/9 |
| 2016/0253299 A1* | 9/2016 | Mese .................... | G06F 40/166 |
| | | | 715/271 |
| 2017/0178528 A1* | 6/2017 | Mayfield ............... | G06F 40/205 |
| 2017/0220360 A1 | 8/2017 | Chiba et al. | |
| 2017/0220533 A1* | 8/2017 | Chiba .................... | G06F 40/253 |
| 2019/0050387 A1 | 2/2019 | Sanghavi et al. | |
| 2020/0159823 A1 | 5/2020 | Lam et al. | |
| 2020/0279017 A1 | 9/2020 | Norton et al. | |
| 2020/0334329 A1* | 10/2020 | Chen .................... | G06F 40/263 |
| 2021/0390258 A1 | 12/2021 | Turcato et al. | |
| 2022/0188514 A1 | 6/2022 | Thota et al. | |

OTHER PUBLICATIONS

"Dyslexia: What Brain Research Reveals About Reading", Retrieved From: http://www.ldonline.org/article/10784/#:~:text=Did%20you%20know%20that%3A,services%20for%20a%20reading%20disorder., Retrieved Date: Nov. 12, 2020, 4 Pages.

"Flesch-Kincaid Readability Tests", Retrieved From: https://en.wikipedia.org/wiki/Flesch%E2%80%93Kincaid_readability_tests, Retrieved Date: Nov. 12, 2020, 6 Pages.

"Fry Readability Formula", Retrieved From: https://en.wikipedia.org/wiki/Fry_readability_formula, Retrieved From Nov. 12, 2020, 1 Page.

"Gunning Fog Index", Retrieved From: https://en.wikipedia.org/wiki/Gunning_fog_index, Retrieved From: Nov. 12, 2020, 3 Pages.

"Readability", Retrieved From: https://en.wikipedia.org/wiki/Readability#McLaughlin's_SMOG_formula, Retrieved From: Nov. 12, 2020, 16 Pages.

Bolton, Anna, "Great Readability. Better Engagement. More Conversions.", Retrieved From: https://readable.com/, Retrieved From: Nov. 12, 2020, 10 Pages.

Colmer, Ruth, "Creating Readability Formulas for Non-English Languages: The Problem of the Syllable", Retrieved From: https://readable.com/blog/creating-readability-formulas-for-non-english-languages-the-problem-of-the-syllable/, Dec. 20, 2017, 11 Pages.

Rello, et al., "Frequent Words Improve Readability and Short Words Improve Understandability for People with Dyslexia", In Book of IFIP Conference on Human-Computer Interaction, Sep. 2, 2013, 19 Pages.

"International Search Report and Written Opinion Issued in PCT Application No. PCT/US20/028173", dated Jul. 31, 2020, 12 Pages.

Putze, et al., "Automatic Classification of Auto-correction Errors in Predictive Text Entry Based on EEG and Context Information", In Proceedings of the 19th ACM International Conference on Multimodal Interaction, Nov. 13, 2017, 9 Pages.

"Grammarly", Retrieved from https://www.grammarly.com/, Retrieved on: Jul. 17, 2019, 4 Pages.

"Repetition Detector 2", Retrieved from https://web.archive.org/web/20191222040718/http://www.repetition-detector.com/, Dec. 22, 2019, 2 Pages.

"Non-Final Office Action Issued in U.S. Appl. No. 17/121,236", dated Mar. 18, 2021, 13 Pages.

"Final Office Action Issued in U.S. Appl. No. 17/121,236", dated Aug. 5, 2021, 15 Pages.

"Common Grammatical Errors: Wordiness", Retrieved From: https://web.archive.org/web/20121015082623/http://bethune.yorku.ca:80/writing/wordiness/, Oct. 15, 2012, 2 Pages.

Ambert, Joan, "Microsoft Word 2019 Step by Step", In Publication of Microsoft Press, Feb. 4, 2019, 24 Pages.

Lambert, Joan, "Microsoft Word 2019 Step by Step: InformIT", Retrieved From: https://www.informit.com/store/microsoft-word-2019-step-by-step-9781509305872, Apr. 2, 2019, 2 Pages.

"International Search Report and Written Opinion Issued in PCT Application No. PCT/US21/026082", dated Jul. 20, 2021, 16 Pages.

Sundararaman, et al., "Syntax-Infused Transformer and BERT Models for Machine Translation and Natural Language Understanding", In Repository of arXiv:1911.06156v1, Nov. 10, 2019, 7 Pages.

"Hemingway Help", Retrieved from: https://web.archive.org/web/20201203111751/https://hemingwayapp.com/help.html, Dec. 3, 2020, 4 Pages.

"How to Use Hemingway Editor for Self-Editing Your Writing", Retrieved from: https://www.youtube.com/watch?v=ddaBulzlnUs, Feb. 13, 2019, 3 Pages.

"Non Final Office Action Issued in U.S. Appl. No. 16/902,034", dated Mar. 7, 2022, 12 Pages.

"International Search Report and Written Opinion Issued in PCT Application No. PCT/US21/061308", dated Mar. 25, 2022, 15 Pages.

Proulx, et al., "Creating Consumer Friendly Health Content: Implementing and Testing a Readability Diagnosis and Enhancement Tool", In Proceedings of 46th Hawaii International Conference on System Sciences, Jan. 7, 2013, pp. 2445-2453.

Yang, et al., "Speculative Requirements: Automatic Detection of Uncertainty in Natural Language Requirements", In Proceedings of the 20th IEEE International Requirements Engineering Conference, Sep. 24, 2012, pp. 11-20.

"Notice of Allowance Issued in U.S. Appl. No. 16/902,034", dated Sep. 8, 2022, 9 Pages.

* cited by examiner

100

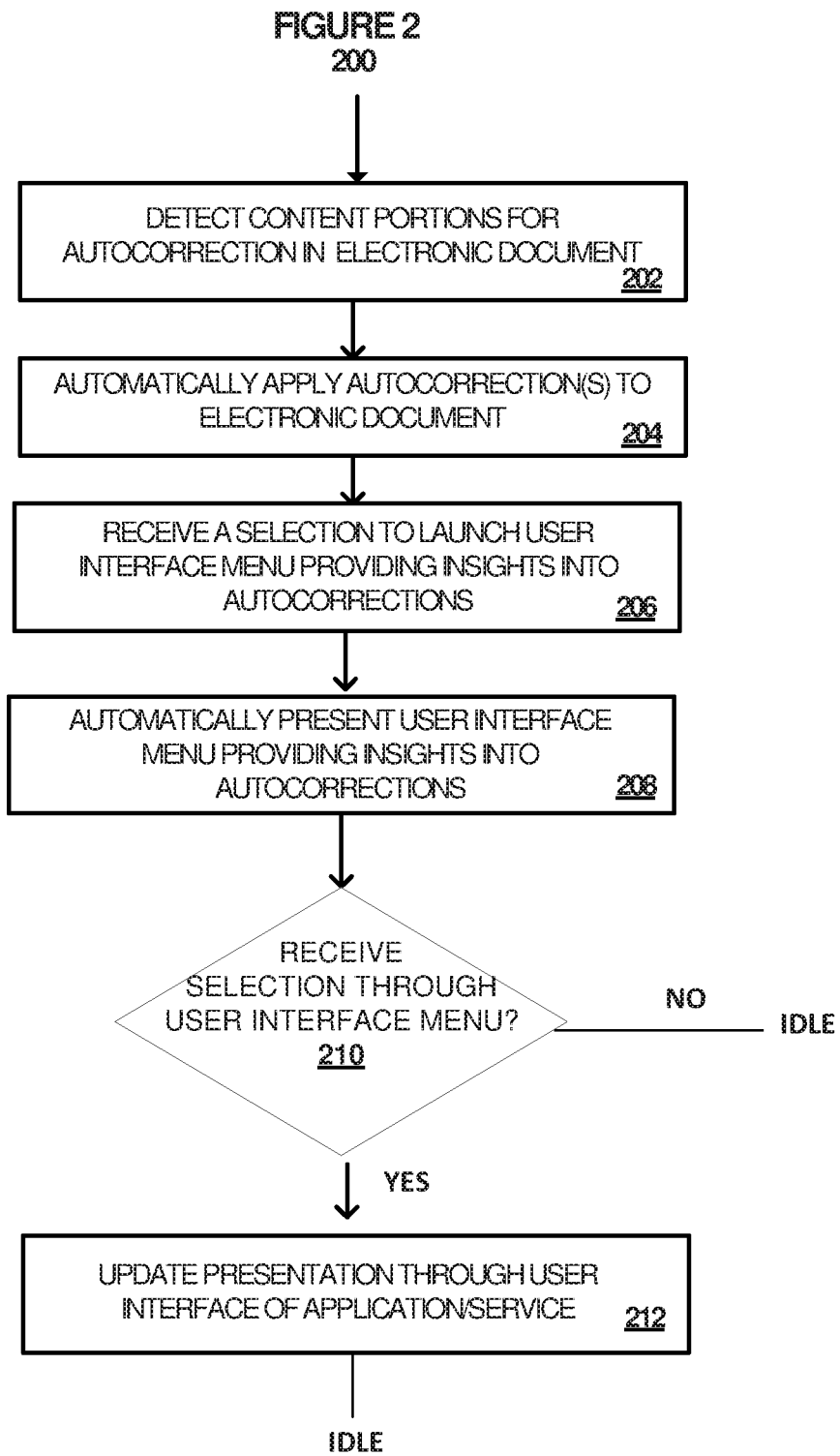

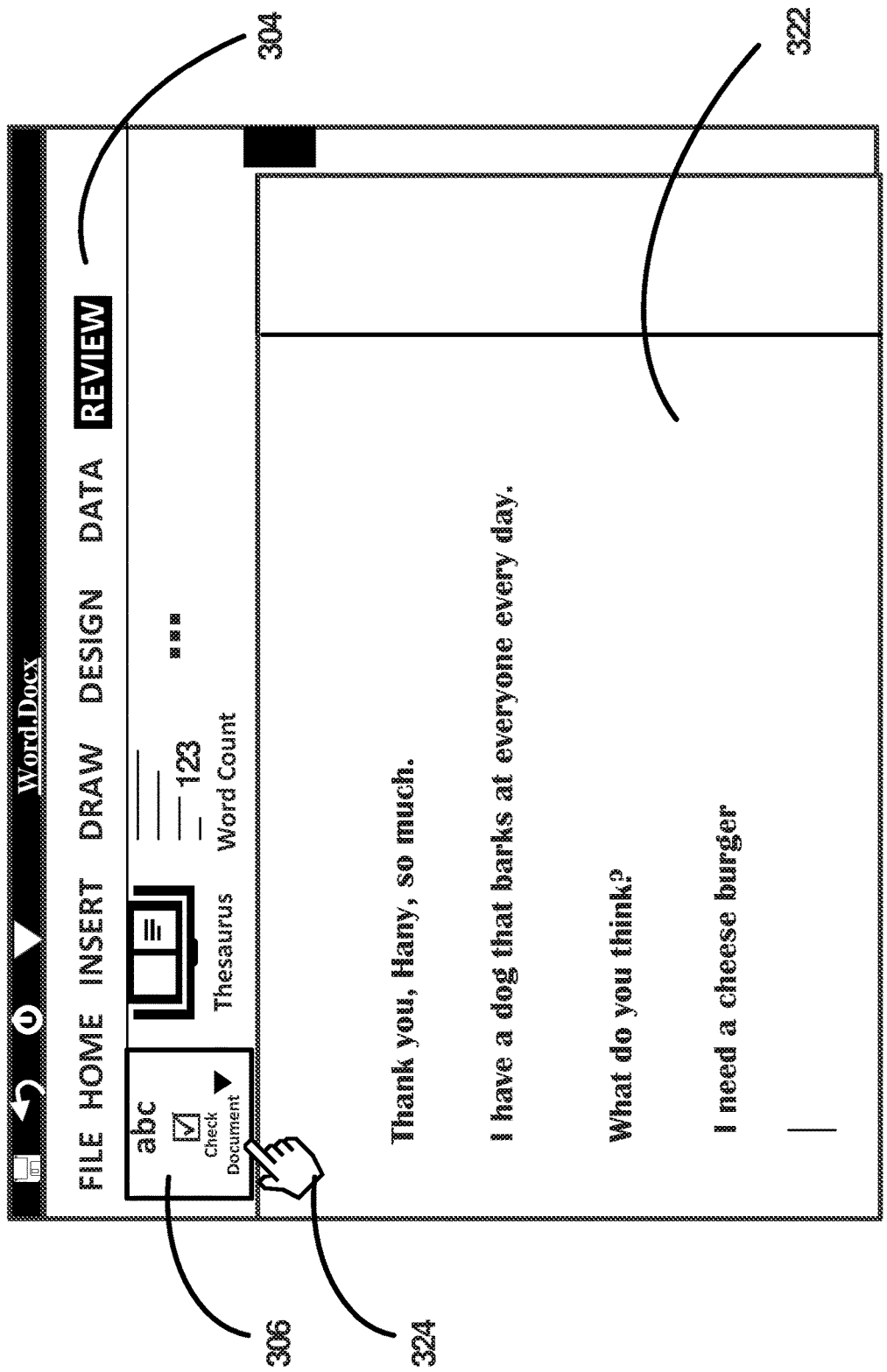

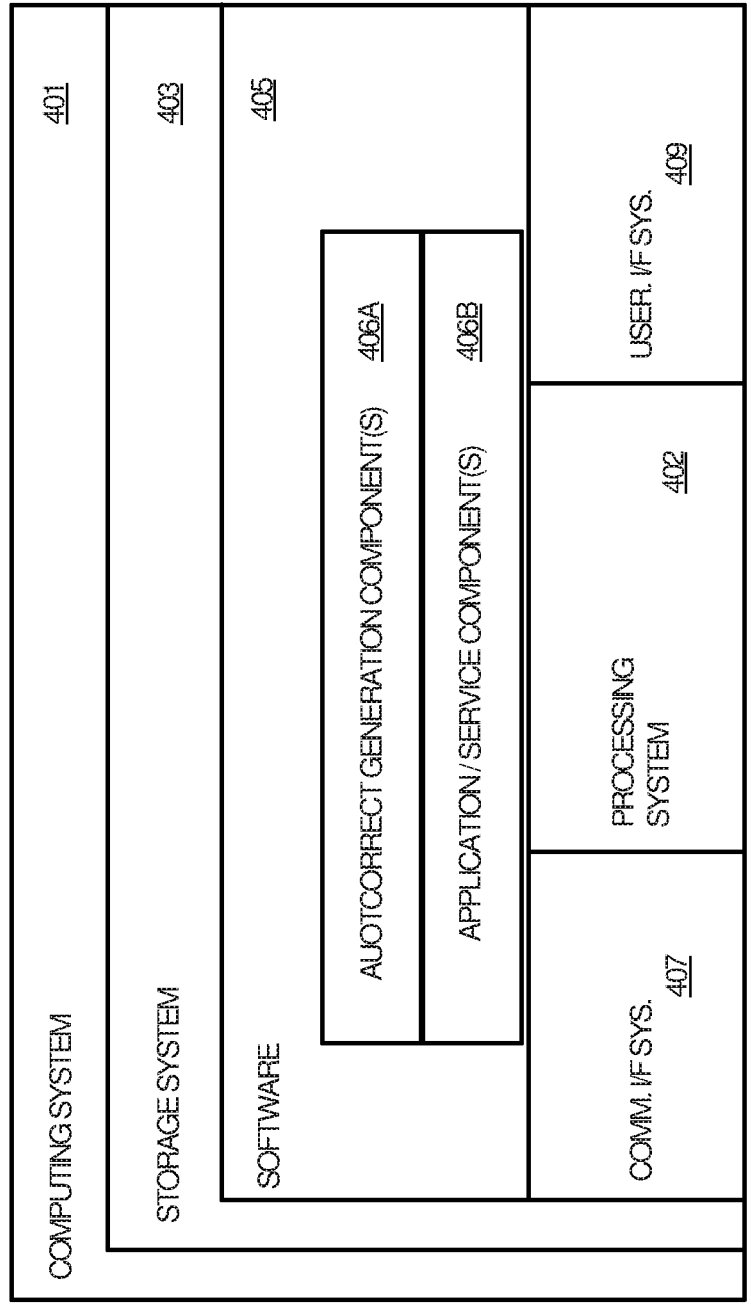

SYSTEMS AND METHODS FOR SEAMLESS APPLICATION OF AUTOCORRECTION AND PROVISION OF REVIEW INSIGHTS THROUGH ADAPTED USER INTERFACE

BACKGROUND

Users are always looking for ways to improve documents they are working on. Traditionally, review functionality such as a spelling/grammar check may be incorporated into applications to provide users with ways to improve their writing. When an error is detected in a document, the user interface provides a general indication that an error is detected. The normal process to remediate an identified error is for the user to manually investigate the error, open a menu, read instructions and then pick a correction from a list of suggestions. Empirical data collected on usage of such functionality suggests that in a majority of cases (e.g., 90 percent of cases), the user selects the first suggestion in a listing. This suggests that a user spends 90 percent of their time proofing and only choose an alternative suggestion 10 percent of the time.

It follows that autocorrection of errors is extremely beneficial to users, their productivity and efficiency of an application that a user is working with. Some applications apply a level of autocorrection on behalf of a user. However, traditional application of autocorrection is limited in the type of correction (e.g., spelling errors) that can be applied. This is typically because a deeper contextual analysis is not performed when evaluating whether to apply an autocorrection.

Another issue that arises with traditional autocorrections mechanisms is that autocorrections are typically applied without much user interface attention. This may result in a user not being properly alerted that a correction has been automatically applied, which ultimately leads to repeat errors by the user causing latency and reduced efficiency during document creation. It follows that user awareness as to causes of errors can be greatly improved. However, traditional user interfaces lack the ability to provide review insights for users when autocorrections are automatically applied.

SUMMARY

In view of the foregoing technical challenges, the present disclosure relates to processing operations configured to provide, through an adapted user interface of an application/service, seamless application of autocorrection for an electronic document and provision of review insights into the autocorrections. In addition to applying autocorrections, processing described herein selectively determines when to apply an autocorrection (e.g., while a user is entering an input or after) and further highlights autocorrections, through a user interface, in a manner that instantly lets a user know that an autocorrection has occurred and/or what type of autocorrection is being applied. Moreover, an adapted user interface provides user interface features than enable access to an intelligent user interface menu that provides a user with feedback mechanisms to better understand types of autocorrections that were made to their electronic document as well as providing user interface features for reversing an autocorrection and/or making further autocorrection changes to an electronic document, among other examples. These user interface features act as mechanisms for improving processing efficiency during application/service usage and associated computing devices that execute said application/service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2 illustrates an exemplary method related to applying autocorrection to an electronic document through an improved user interface of an application or service, with which aspects of the present disclosure may be practiced.

FIGS. 3A-3H illustrate exemplary processing device views associated with user interface examples for an improved user interface of an application or service that is configured for management of autocorrections to an electronic document, with which aspects of the present disclosure may be practiced.

FIG. 4 illustrates a computing system suitable for implementing processing operations described herein related to management of autocorrection processing and associated user interface generation, with which aspects of the present disclosure may be practiced.

DETAILED DESCRIPTION

Figure 1:
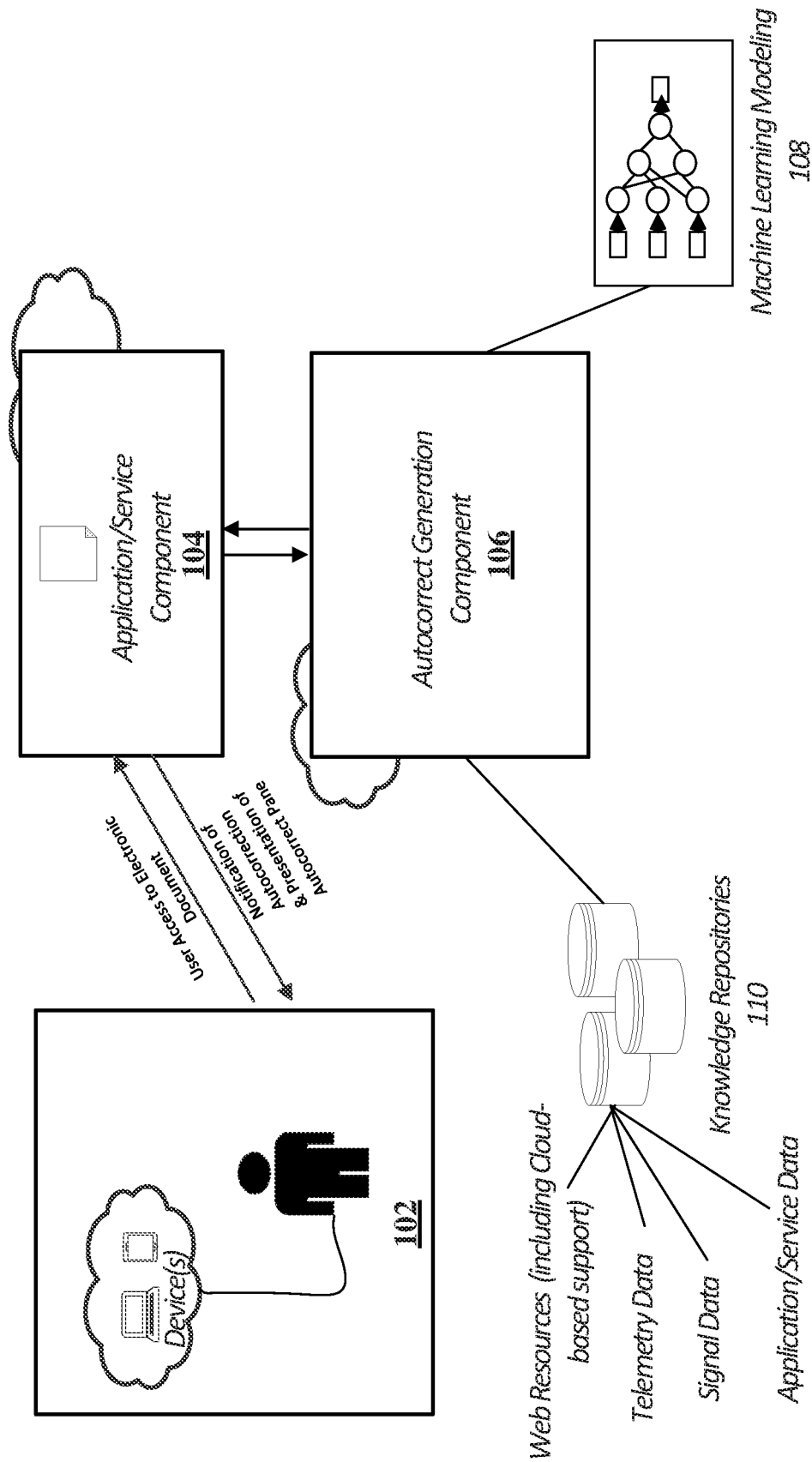
FIG. 1 illustrates an exemplary process flow providing exemplary components for improving application/service functionality and user interface when applying autocorrection to an electronic document as described herein, with which aspects of the present disclosure may be practiced.

The present disclosure relates to processing operations configured to provide, through an adapted user interface of an application/service, seamless application of autocorrection for an electronic document and provision of review insights into the autocorrections. For ease of understanding, the present disclosure references autocorrections of typographical errors as a basis for autocorrection and insight review. However, it is to be understood that autocorrections and insights can also be applied for any type of autocorrection including but not limited to corrections for: modifying passive voice/active voice, modifying persuasiveness of writing; replacing words to vary usage across an electronic document; suggesting usage of synonyms/antonyms; inserting reference content (e.g., quotations, citations); and applying legal language, among other examples.

In addition to automatically applying autocorrections, processing described herein selectively determines when to apply an autocorrection (e.g., while a user is entering an input or after) and further highlights autocorrections, through a user interface, in a manner that instantly lets a user know that an autocorrection has occurred and/or what type of autocorrection is being applied. Moreover, an adapted user interface provides user interface features than enable access to an intelligent user interface menu providing review of applied autocorrections. An example user interface menu provides a user with feedback mechanisms to better understand types of autocorrections that were made to their electronic document as well as providing user interface features for reversing an autocorrection and/or making further autocorrection changes to an electronic document, among other examples. These user interface features act as mechanisms for improving processing efficiency during application/service usage and associated computing devices that execute said application/service.

In non-limiting examples, one or more content portions for autocorrection are detected in an electronic document that is presented through a user interface of an application or service. One or more autocorrections are automatically applied to the one or more content portions in the electronic document. A selection of a user interface element may be received through a user interface of the application/service, where the user interface element is configured to launch a user interface menu that provides review insights into the autocorrections. The user interface menu is automatically presented through the user interface based on the received selection of the user interface. Among other types of functionality, the user interface menu may comprise: a listing of a state of the one or more content portions before autocorrection is applied, a listing of autocorrections automatically applied to the electronic document, a classification identification classifying a type of autocorrection for the one or more content portions, and a selectable user interface feature that is configured to automatically undo an autocorrection of the one or more content portions.

Processing of the present disclosure implements an autocorrect generation component that applies intelligent analysis when detecting that an autocorrection is to be applied, thereby helping enhance the ability of an application/service to provide meaningful review insights for applied autocorrections. As an example, the autocorrect generation component is configured to detect a typographical error (or other type of content portion for autocorrection) in an electronic document, which is a trigger for executing processing operations that comprise but are not limited to: determining a classification identification for an autocorrection, determining a location of the autocorrection (e.g., in a sentence or statement) relative to other content, and generating confidence scoring for candidate autocorrections of the one or more typographical errors. These collective processing operations are utilized to determine when to apply an autocorrection as well as identify how to notify a user of an autocorrection through the user interface of the application/service. In one example, results of this collective analysis, initiated upon detection of a typographical error, provides a basis for determine whether an autocorrection is to be applied while the user is still providing input (e.g., a typed input) or whether to wait until after a pause is detected from an input.

Furthermore, a classification identification for a typographical error (e.g., spelling, grammar, specific types of grammar such as punctuation, subject/verb agreement) or other type of autocorrection may be a trigger for presenting a specific type of graphical user interface effect during autocorrection of a typographical error. The classification identification classifies a type of autocorrection for one or more content portions that are identified for autocorrection. For instance, spelling autocorrections may be highlighted in a different color, presented as a different graphical effect (e.g., bubble, rectangle, triangle) etc., as compared with a different classified type of for a specific content portion (e.g., grammar or punctuation, correction of passive voice, varying word usage).

In further examples, a user interface menu that is configured to provide insights into autocorrections may comprise a user interface element that enables a user to set a level of autocorrection during access to the electronic document. For instance, a level of autocorrection corresponds with a threshold level of confidence for applying a candidate autocorrection to an electronic document (e.g., to correct one or more typographical errors). In one example, the user interface element is an adjustable slide-bar feature, where a user is able to set and adjust a level of autocorrection (e.g., low, conservative, high) that is to be applied during access to an electronic document. For instance, a low autocorrection designation may autocorrect content when a highest confidence level threshold (e.g., >95 percent) is determined while higher autocorrection level settings may apply autocorrections when less stringent confidence level thresholds are satisfied. In further examples, determination of a level of autocorrection that is selected may also enable the autocorrect generation component to select a most appropriate action such as: determining whether to automatically apply an autocorrection, determining whether to provide a suggestion for autocorrection in the user interface menu, or determining to ignore application of an autocorrection.

Exemplary technical advantages provided by processing described in the present disclosure comprise but are not limited to: enhancement of processing efficiency during access to an electronic document in real-time (or near real-time); improved processing efficiency (e.g., reduction in processing cycles, saving resources/bandwidth) for computing devices when applying autocorrections; adapting and improving front-end user interfaces that enhances application of autocorrections and provides a customized user interface menu providing review insights into applied autocorrections; improved notification, through a user interface, of applied autocorrections; reduction in latency in implementing various types of autocorrections; enabling an autocorrection generation component to interface with a plurality of applications/services (e.g., applications/services of a software application platform) to extend functionality of the applications/service during execution; and improving usability of applications/services for users, among other technical advantages.

FIG. 1 illustrates an exemplary process flow 100 providing exemplary components for improving application/service functionality and user interface when applying autocorrection to an electronic document as described herein, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure. Moreover, process flow 100 describes components that may be utilized to execute method 200 (FIG. 2) as well as provide user interface examples illustrated and described in FIGS. 3A-3H and the accompanying description.

Process flow 100 comprises user computing device(s) 102 (e.g., client computing device). An example of a user computing device 102 is a computing system (or computing systems) as described in the description of FIG. 4. A user may interact with an exemplary application/service through the user computing device(s) 102. For instance, the user may connect to an application/service through any number of different device modalities. In some examples, a user may connect to an application/service (e.g., a productivity application/service that is utilized to create or modify an electronic document) through different user computing devices 102, where non-limiting examples of such are: a smart phone, a laptop, a tablet, a desktop computer, etc. In other instances, a user may carry on a multi-modal communication with an application/service via multiple user computing devices.

A user may be accessing, through interfacing between a computing device 102 and an application/service component 104, one or more application/services that are used to execute any type of task including document creation and/or modification. An application/service that the user is accessing is configured to provide a user interface or graphical user interface (GUI) that enables access to and creation/modification of electronic documents. Exemplary functionality described herein including an improved user interface may be provided through an application/service component 104 that is configured to enable applications/services to be accessed by users and presented on a user computing device 102. An example user interface may be adapted to provide new functionality described herein, where back-end processing as well as front-end user interface features and application command control are described that is not present in traditional user interface systems. Intelligent processing operations are described herein that enhance the application of autocorrections to an electronic document as well as provide a user with review insights into applied autocorrections. Processing device views that illustrate non-limiting user interface examples of the present disclosure are provided in FIGS. 3A-3H.

An electronic document (or electronic file) is a representation of content in an electronic media/electronic format such as a digital file. Examples of electronic documents may vary, where files may be created to work with any type of application/service and in any type of file format as known to one skilled in the field of art. For instance, an electronic document may be created for a word processing service, notetaking service, slide-based presentation service, etc., where the electronic document may comprise authored content. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content. Electronic documents may also include message content examples such as email messages, instant text messages and social media postings, among other examples. As a non-limiting example, an electronic document may be a word processing document, where access is provided through a word processing application/service, distributed storage, etc. In that example, content of the word processing document may be evaluated to determine when and how to apply autocorrections as well as provide review insight on behalf of users.

As referenced above, exemplary applications/services may interface with other components of process flow 100 to enhance processing efficiency and functionality as described herein. The application/service component 104 is configured to interface with other components of process flow 100 including computing device(s) 102 and the autocorrect generation component 106. Applications/services may be any type of programmed software. An exemplary application/service is a productivity application/service that is configured for execution to enable users to complete tasks on a computing device, where exemplary productivity services may be configured for access to and creation of content including electronic documents. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/service, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of an application platform providing a suite of productivity applications/services. An application platform suite is configured to providing access to a plurality of applications/services, thereby enabling cross-application/service usage to enhance functionality of a specific application/service at run-time. Moreover, specific application/services as well as application platform suites (e.g., software application platform providing correlated access to a plurality of applications/services) may be configured to interface with other non-proprietary application/services (e.g., third-party applications/services) to extend functionality including data transformation and associated implementation.

The application/service component 104 is configured to interface with the autocorrect generation component 106. In doing so, signal data may be collected by either: the application/service component 104; or the autocorrect generation component 106 via the application/service component 104, to enable contextual processing of user access to an electronic document through one or more applications/services. Access to an electronic document may a trigger to begin reviewing content for the ability to automatically apply autocorrections. In some examples, autocorrections may be automatically applied to already existing content upon access to an electronic document by a user. In other examples, autocorrections may be automatically applied to new content added by a user. The new user interface menu that is configured for providing review insights into applied autocorrections may provide review insights for either of those technical instances.

In one example, a framework for the application/service may be coded to detect user access and selection of user interface elements, etc., and respond accordingly. In other examples where the autocorrect generation component 106 is configured for detecting access through an application/service, an API or listener component may be utilized to trigger analysis of content of the electronic document. In some cases, the application/service component 104 is managing a user interaction with a single application/service and in other instances the application/service component 104 is managing a user interaction with multiple applications/services. As an example, detected access to the electronic document may be occurring in real-time by a user through the application/service, where analysis of content of the electronic document may occur in real-time as well.

The application/service component 104 is configured to present, through interfacing with the autocorrect generation component 106, an adapted user interface that provides user interface elements to manage applied autocorrections. For instance, an application/service may be configured to provide a user interface element that initiates display of a user interface menu that is presented to provide review insights into applied autocorrections for an electronic document. In one example, a user interface element may be configured to initiate generation launch of the user interface menu providing review insights into applied autocorrections. An application command control (e.g., user interface ribbon) may be adapted to include a selectable user interface feature to initiate display of the user interface menu providing review insights into autocorrections. In another example, a user interface ribbon may have a selectable menu feature that reveals a sub-menu providing a user interface feature to launch the user interface menu providing review insights into applied autocorrections. In yet another example, an application/service may be configured to receive voice input, which may be a trigger for launch the user interface menu providing review insights into applied autocorrections. Alternatively, the application/service component 104 may be configured to interface with the autocorrect generation component 106 to identify a command (e.g., via a selected user interface element) through another application/service for initiation of launch the user interface menu providing review insights into applied autocorrections. Non-limiting visual examples of user interface elements to launch the described user interface menu are provided in FIGS. 3A-3H.

The autocorrection generation component 106 is one or more components configured to manage application of autocorrection and tracking and provision of review insights for applied autocorrections, for example, through an adapted user interface menu. The autocorrection generation component 106 interfaces with other components such as the application/service component 104, machine learning modeling 108 and knowledge repositories 110, which are utilized to enhance autocorrection processing as well as adapt a user interface of an application/service to provide new functionality described here. The autocorrection generation component 106 may further be configured to monitor interaction with user interface features of an application/service, for example, to detect whether to apply an autocorrection as well as determine whether to surface a representation of a user interface menu providing review insights for applied autocorrections. Autocorrections may be automatically applied by the autocorrection generation component 106 based on execution of programmed code that tailored to evaluate content and metadata of an electronic document, trained machine learning modeling, or a combination thereof. In one example, autocorrections are automatically applied, through the application/service by the application/service component 104 based on interfacing (e.g., through API) with the autocorrection generation component 106. In another example, the autocorrection generation component 106 is configured to detect activity in an application/service and apply processing operations described herein to update a user interface of an application/service that a user is working with.

Autocorrection processing described here may include a plurality of processing operations are executed by the autocorrection generation component 106. Example processing operations comprise but are not limited to: determining a document type for an electronic document; detecting heading information for the content of the electronic document; determining sections of the electronic document; determining a location of a content portion for autocorrection relative to other content of the electronic document (e.g., including individual words and sentences in an electronic document); detecting receipt of input updating an electronic document (e.g., including receipt of typing input); predictive determination evaluation for detecting completion of sentences in an electronic document; detecting whether there is a pause or end to receipt of typing input (e.g., based on time detection between inputs received, detection of changes in types of input such as keyboard entry versus touch input or other device input); determining that a type of autocorrection is to be applied to a content portion; retrieving candidate autocorrections for automated application of an autocorrection for a content portion; executing ranking processing to generate confidence scoring for selection of a candidate autocorrection to replace a content portion; executing ranking processing that generates confidence scoring as to when to automatically apply an autocorrection; selecting autocorrections to apply based on evaluation of ranking processing; determining whether to apply bulk autocorrection or provide autocorrection suggestions for a user to review; executing processing that detects a classification of an autocorrection and selecting a user interface that creates visual user interface effect that highlights the one or more content portions for autocorrection during application of the one or more autocorrections; and generating and presenting a user interface menu providing review insights into applied autocorrections, among other examples.

Data that may be utilized to determine whether to apply may comprise but is not limited to: content and metadata of one or more electronic documents; collected signal data (e.g., from usage of an application/service, device-specific, user-specific); telemetry data including past usage of a specific user and/or group of users; a corpus of training data used to build and train a machine learning modeling; machine learning accuracy models (e.g., internally managed by a provider of a software application platform and/or externally managed and accessed) and web-based resources, among other examples. Data such as collected signal data, telemetry data and web-based resource data may be utilized to enhance importance ranking for specific contextual scenarios including user-specific preferences, determining whether to automatically apply autocorrections, determining when to automatically apply autocorrections, suggesting candidate autocorrections, determining confidence scoring for candidate autocorrections as well as confidence scoring indicating when to automatically apply autocorrections and/ or identifying data that can be utilized to adapt a user interface menu to enhance autocorrection processing based on received user feedback. That is, these ancillary types of data can be utilized to help train machine learning modeling to intelligently apply autocorrections and provide contextual insights for a user.

Knowledge repositories 110 may be accessed to obtain data for generation, training and implementation of machine learning modeling 108 including identifying candidate autocorrections suggestions as well as determining when and how to apply candidate autocorrections. Knowledge resources comprise any data affiliated with a software application platform (e.g., Microsoft®, Google®, Apple®, IBM®) as well as data that is obtained through interfacing with resources over a network connection including third-party applications/services. Examples of data maintained by knowledge repositories 110 comprises but is not limited to: collected signal data (e.g., from usage of an application/service, device-specific, user-specific); telemetry data including past usage of a specific user and/or group of users; a corpus of training data used to build and train a machine learning modeling; machine learning accuracy models (e.g., internally managed by a provider of a software application platform and/or externally managed and accessed); web-based resources including any data accessible via network connect; and application/service data (e.g., data of applications/services managed by the application/service component 104) for execution of specific applications/services including electronic document metadata, among other examples. As an example, the autocorrection generation component 106 is configured to interface with a document editing service to retrieve access to editing and proofreading resources to suggest candidate autocorrections. Moreover, the autocorrection generation component 106 is configured to interface with a cloud-assistance service that can provide functionality that enables advanced insights into autocorrection suggestions. The cloud-assistance service can extend proofreading and editing capabilities to select candidate autocorrection suggestions as well as establish connections between the autocorrection generation component 106 and useful web-based resources so that processing efficiency can be improved (and latency in processing reduced). Among other types of processing to aid automated autocorrection processing, the cloud-assistance service may execute processing operations such as: determining whether to split a typographical error into multiple words; determining whether to combine words into a single word; determining how to manage compound sentences in an electronic document; and increase precision and accuracy to connect the autocorrection generation component 106 with web-based applications/services, among other examples. In further examples, the autocorrection generation component 106 is configured to interface with a web search service, entity relationship databases, etc., to extend a corpus of data to make the most informed decisions when automatically applying autocorrections on behalf of a user. In even further examples, telemetry data may be collected, aggregated and correlated to further provide an autocorrection generation component 106 with the ability to apply the best possible autocorrections as well as provide users with the most accurate review insights. For instance, user feedback data may be collected from previous autocorrection instances (including spelling and grammar review in traditional application/service, whether users accepted or reversed an automatically applied autocorrections, whether autocorrection functionality was turned on/off, etc., which may be utilized to sort candidate autocorrection suggestions as well as determine how to apply autocorrection functionality.

Machine learning modeling 108 may be executed by the autocorrection generation component 106 to enhance application of autocorrection and provision of review insights into applied autocorrections. Creation, training and update of a machine learning modeling 108 is known to one skilled in the field of art. In examples of the present disclosure, known examples of machine learning modeling is adapted to generate and expose an intelligent learning model for execution of the processing operations described herein. In doing so, the intelligent learning model is created, trained and implemented, to correlate content portions of an electronic document with data that is utilized to automatically apply autocorrection to an electronic document. For example, one or more layers of abstraction may be applied during the machine learning modeling 108, where the one or more layers of abstraction correlate content portions of an electronic document with candidate autocorrections as well as management application of autocorrection.

Machine learning modeling 108 may be configured to train and employ one or more rankers. A ranker is trained to score the importance of candidate autocorrections for specific content portions and/or determine when and how to automatically apply an autocorrection. In doing so, a ranker may be configured to utilize a corpus of training data, including data managed by the knowledge repositories, as inputs to execute confidence scoring upon which the above identified determinations can be made. Ranking processing, ranking methodologies (including classification and regression analysis) and implementation of an exemplary ranker is known to one skilled in the field of art. Above what is known, the machine learning modeling 108 may be trained and tested to generate confidence scoring for, individually or in combination, any of: applicability of candidate autocorrections for specific content portions; classifying a type of autocorrection and/or reason why a content portion is to be autocorrect; determining when to automatically apply an autocorrection on behalf of a user; and selecting a type of visual user interface effect to represent an automatically applied autocorrect among other examples. In further examples, developers may implement weighting to emphasize priority of specific aspects of ranking processing over others, where developers can assign different weights to different types of inputs to generate tailored ranking processing.

The autocorrection generation component 106 is further be configured to interface with the application/service component 104 to automatically apply autocorrections as well as provide a user interface menu configured for providing review insights into applied autocorrections. Ranked results, provided by the ranker, may be utilized to determine what autocorrections to automatically apply, how to automatically apply autocorrections and what types of review insights to provide to user through an adapted user interface. In further examples, machine learning modeling 108 may be configured to determine whether autocorrections should be applied in bulk or provided as suggestions for a user to accept on their own. For instance, a user interface menu or other user interface element of application command control may be configured to enable users to select whether autocorrections should be fixed in bulk (e.g., through selection of specific types of autocorrections. In other examples, bulk autocorrection may be automatically applied based on results of machine learning modeling 108, where a user has the ability to undo autocorrections that were automatically applied in bulk.

An adapted user interface may comprise a user interface menu that manages applied autocorrections for an electronic document. The user interface menu is configured to automatically provide review insights for users to: better understand applied autocorrections, efficiently take remedial action if a user would like to undo an applied autocorrection as well as provide insights to improve processing efficiency during subsequent editing of electronic documents. An example user interface menu providing review insights for applied autocorrections may comprise but is not limited to: a listing of a state of the one or more content portions before autocorrection is applied, a listing of autocorrections automatically applied to the electronic document, a classification identification classifying a type of autocorrection for the one or more content portions, and a selectable user interface feature that is configured to automatically undo an autocorrection of the one or more content portions. Non-limiting visual examples of a user interface menu are provided in the FIGS. 3C-3H.

In further examples, the user interface menu providing review insights into applied autocorrections may further comprise user interface elements to enable additional insights to be provided into why autocorrections were automatically applied. For example, a user may select, scroll-over, etc., a user interface feature that provides a user interface callout detailing why an autocorrection was automatically applied, providing intelligence into automated autocorrection processing. This feature may not only assist a user with understanding context as to why an autocorrection was applied, but also provide a gateway to receiving feedback to adapt future autocorrection processing. For instance, a user may select an insight into a specific applied autocorrection and then select the "undo" user interface feature for that specific autocorrection. This may provide insights that a user did not agree with the autocorrection and/or the rationale. In further example, the user interface menu providing review insights into applied autocorrections may also comprise a feedback mechanism, provided as a user interface element, to enable users to provide comments on the autocorrection processing as whole or specific autocorrections. This data may also be leveraged to improve future automation of autocorrect processing.

In another example, the user interface menu may further comprise a user interface element that, when selected, is configured to enable a plurality of content portions in an electronic document, that are candidates for autocorrection, to be replaced at the same time (e.g., a "fix all" or "bulk correction" feature). The user interface menu is further configured to enable user to go through a listing of autocorrections that were automatically applied and manually undo, as the user sees fit, individual autocorrections that were automatically applied. Over time, machine learning processing learns what types of errors that users typically undo and utilize this data to enhance subsequent application of autocorrection processing. For instance, machine learning modeling 108 may generate scoring that is aggregated to specific levels (e.g., user specific, tenant specific and/or globally applied), which can then be utilized in confidence scoring to determine whether an autocorrection should be automatically applied or suggested. Results from this type of machine learning processing may further be utilized to order a presented listing of automatically applied autocorrections (or alternatively suggestions for autocorrection), so that applied autocorrections that are considered higher priority may be prioritized in a listing for a user to see. For instance, confidence scoring may indicate that an autocorrection should be automatically applied but the confidence scoring may have barely met or exceeded a threshold. This type of automatically applied autocorrection may be prioritized for review (e.g., at the top of the listing) so the user can review that before other automatically applied autocorrections that the autocorrection generation component 106 has more confidence in. In another example, machine learning modeling 108 may determine that one automatically applied autocorrection has more of an impact on the electronic document than another type of automatically applied autocorrection, for example, based on processing results of applied machine learning modeling 108. In that case, the more important of the automatically applied autocorrections, as determined by machine learning modeling, may be prioritized in a review listing of applied autocorrections so that the user does not overlook that automatically applied autocorrection.

An example user interface menu may further comprise selectable user interface features to enable drilling into additional layers of review analysis. For example, the autocorrection generation component 106, synchronizes with the application/service component 104 to access an autocorrection setting sub-menu. The autocorrection setting sub-menu may be configured with user interface elements to enable users to set specific parameters related to application of autocorrection processing to an electronic document a user is working with. As an example, an autocorrection setting sub-menu may comprise a user interface element that enables a user to set a level of autocorrection during access to the electronic document. For instance, a level of autocorrection, that is applied to an electronic document, corresponds with a threshold level of confidence for applying a candidate autocorrection to the electronic document (e.g., to correct one or more typographical errors). In one example, the user interface element is an adjustable slide-bar feature, where a user is able to set and adjust a level of autocorrection (e.g., low, conservative, high) that is to be applied during access to an electronic document. For instance, a low autocorrection designation may autocorrect content when a highest confidence level threshold (e.g., >95 percent) is determined while higher autocorrection level settings may apply autocorrections when less stringent confidence level thresholds are satisfied. In further examples, determination of a level of autocorrection that is selected may also enable the autocorrect generation component to select a most appropriate action such as: determining whether to automatically apply an autocorrection, determining whether to provide a suggestion for autocorrection in the user interface menu, or determining to ignore application of an autocorrection. While a slide-bar is one example of a user interface feature, it is to be understood that other types of user interface elements could be utilized to achieve the same functionality without departing from the spirit of the present disclosure.

Additionally, an autocorrection setting sub-menu may further comprise user interface elements for selecting when to apply autocorrection to an electronic document. As indicated in the foregoing, some processing examples may utilize results of machine learning processing to determine whether to apply an autocorrection while a typing input is received or after a typing input is received. In some alternative instances, an autocorrection setting sub-menu may comprise selectable user interface elements that, when selected by a user, toggle whether autocorrection is applied during receipt of a typing input or afterwards. In further examples, the autocorrection generation component 106 may apply autocorrection to both instances (e.g., during receipt of typing input and after pause/end is detected), where classification of the type of autocorrection may yield a determination as to whether to apply the autocorrection instantaneously (e.g., during typing input) or wait until a pause/end to the typing input is detected. The autocorrection generation component 106 may be configured to determine confidence scoring for not only classification of a type of autocorrection (e.g., spelling error, grammar error, correction to improve language usage) but also for candidate autocorrections that would be automatically applied during autocorrection.

Confidence scoring may be utilized to determine whether an autocorrection is immediately applied or after typing input is received. For instance, detected spelling errors, that the autocorrection generation component 106 classifies as a spelling error may be automatically applied during typing, when it is determined that such a correction does not rely on other content being typed in a sentence, whereas a decision as to whether to autocorrect a sentence to add a comma may be applied after a sentence is completed. In one example, the autocorrection generation component 106, interfacing with the application/service component 104, may be configured to execute processing operations to detect whether typing input has paused or ended. In another example, the application/service component 104, interfacing with the autocorrection generation component 106, may be configured to execute processing operations to detect whether typing input has paused or ended. The autocorrection generation component 106 may be configured to detect certain intervals of time between input receive to determine whether a pause is detected, or a typing input has ended. Additionally, the autocorrection generation component 106 may evaluate content associated with a received input (e.g., whether punctuation is added) to determine whether a whether a pause is detected, or a typing input has ended.

In further examples, an autocorrection setting sub-menu may further comprise user interface elements for selecting types of autocorrections to automatically apply. For instance, classification identification may be utilized to classifying a type of autocorrection for the one or more content portions, where that classification identification is then used to determine how and when to automatically apply an autocorrection. The user interface menu may comprise one or more selectable features that enables a user to toggle (e.g., on/off) whether automated autocorrection applies to a specific type of classification identification. That way, when evaluation of a content portion yields a determination that a potential autocorrection is of a specific type, the autocorrection generation component 106 is able to utilize the selected features to determine whether to automatically apply an autocorrection or forego some of the additional processing, thereby improving processing efficiency and reducing latency during real-time execution.

Moreover, the autocorrection setting sub-menu may further comprise user interface elements for selecting whether to turn on cloud-based assistance for autocorrection processing. In some examples, cloud-based assistance for autocorrection processing may be automatically turned on/off based on whether a network connection is established. However, the user interface menu providing review insights into applied autocorrections or the autocorrection setting sub-menu may be configured to enable a user to toggle this functionality.

Furthermore, processing operations of the autocorrection generation component 106 may be written into the coding of an application/service, where an application/service may be adapted to implement functionality described in the present disclosure. In another example, processing by the autocorrection generation component 106 may be executed by a stand-alone application/service that is configured to interface with the application/service component 104 to provide customized application experiences. For example, an application/service for autocorrection management may interface with a software application platform providing an application platform suite of productivity applications/services, where generated presentation documents can be tailored to the specific context of a user workflow. In such an example, the autocorrection generation component 106 may interface with the application/service component 104 through an API.

FIG. 2 illustrates an exemplary method 200 related to applying autocorrection to an electronic document through an improved user interface of an application or service, with which aspects of the present disclosure may be practiced. Processing operations described in method 200 may be executed by components described in process flow 100 (FIG. 1), where the detailed description in process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

As an example, method 200 may be executed across an exemplary computing system (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where content portions of an electronic document are detected as candidates for autocorrection processing. Detection of access to electronic documents and associated processing has been described in the foregoing description including the description of process flow 100 (FIG. 1). Detection (processing operation 202) of the one or more content portions as candidates for autocorrection processing may comprise application of programmed code and/or machine learning modeling that contextually evaluates a context for a content portion that is a candidate for autocorrection. Detection (processing operation 202) of the one or more content portions as candidates for autocorrection comprises: determining a content portion that may be edited/updated based on application of knowledge repositories and trained evaluation (e.g., machine learning modeling); determining a classification identification for the content portion that is a candidate for autocorrection; determining a location of the one or more portions for autocorrection relative to other content in the electronic document; and generating confidence scoring for candidate autocorrections of the one or more one or more content portions for autocorrection.

Flow of method 200 may proceed to processing operation 204, where one or more autocorrections are automatically applied to the one or more detected content portions in the electronic document. Processing operation 204 may built off the contextual evaluation of a candidate for autocorrection that occurred in processing operation 202, where a determination to automatically apply an autocorrection may select from candidates for autocorrection as well as determine how and when to apply an autocorrection. Automatic application of autocorrections has been described in the foregoing description including the description of process flow 100 (FIG. 1).

Automatic application (processing operation 204) of autocorrection may comprise processing operation that include but are not limited to: generating confidence scoring for candidate autocorrections to replace the one or one or more content portions; selecting from a ranked list of candidate autocorrections, an autocorrection to be applied based on the confidence scoring for the candidate autocorrections; generating confidence scoring for determining when to apply an autocorrection; selecting when to automatically apply the autocorrection based on the confidence scoring for determining when to apply the autocorrection; and selecting a user interface visual effect to highlight automated application of an autocorrection based on a classification identification of the type of autocorrection.

Furthermore, as described in the foregoing, automated application of autocorrections may yield a determination as to when to automatically apply an autocorrection. For example, automatically applying (processing operation 204) autocorrections in the electronic document may comprise: determining that an autocorrection for the one or more content portions is to be applied after a pause in typing input is detected based on a collective analysis of the classification identification, a determined location of the one or more content portions for autocorrection and the generated confidence scoring for the candidate autocorrections. In another example, automatically applying autocorrections in the electronic document comprises determining that an autocorrection for the one or more content portions for autocorrection is to be applied during a receipt of a typing input based on a collective analysis of the classification identification, the determined location of the one or more one or more content portions and the generated confidence scoring for the candidate autocorrections.

Additionally, automatic application (processing operation 204) of an autocorrection may yield determinations that select a visual user interface effect to apply to highlight application of an automated autocorrection as well as create the visual user interface effect. As identified above, the created visual user interface effect may highlight the one or more content portions for autocorrection during application of the one or more autocorrections in a unique way, where the visual user interface effect is based on a classification identification of a type of the one or more content portions. For instance, spelling autocorrections may be highlighted in a different color, presented as a different graphical effect (e.g., bubble, rectangle, triangle) etc., as compared with a different classified type of for a specific content portion (e.g., grammar or punctuation, correction of passive voice, varying word usage).

In some alternative examples, autocorrections are not automatically applied. For instance, processing may determine that a confidence scoring threshold is not achieved for automatic application of a specific autocorrection. In such instances, autocorrection suggestions may be generated and surfaced automatically though a user interface of an application/service on behalf of a user (e.g., either through a user interface menu providing review insights into autocorrections or through user interface callouts).

Flow of method 200 may proceed to processing operation 206, where a user interface selection is received, through an application/service, to launch a user interface menu that provides insights into applied autocorrections. Examples of a user interface feature to initiate launch of an adapted user interface menu has been described in the foregoing description. Visual examples of a user interface feature configured to launch the adapted user interface menu are provided in FIGS. 3A-3H.

In response to the received selection of the above identified user interface feature, flow of method 200 proceeds to processing operation 208. At processing operation 208, the user interface menu is automatically presented through the user interface based on the received selection of the user interface. Among other types of functionality, the user interface menu may comprise: a listing of a state of the one or more content portions before autocorrection is applied, a listing of autocorrections automatically applied to the electronic document, a classification identification classifying a type of autocorrection for the one or more content portions, and a selectable user interface feature that is configured to automatically undo an autocorrection of the one or more content portions. Further description the user interface menu that is configured to provide review insights into applied autocorrections has been described in the foregoing description including the description of process flow 100 (FIG. 1). Visual examples of an example user interface menu are provided in FIGS. 3A-3H.

Flow of method 200 may then proceed to decision operation 210. At decision operation 210, it is determined whether a selection is received through the user interface menu that provides insights into applied autocorrections. Examples of processing related to user interface features of the above identified user interface menu have been provided in the foregoing description including the description of process flow 100 (FIG. 1). Visual examples of interactions through the example user interface menu are provided in FIGS. 3A-3H. In examples where no selection is made through the user interface menu, decision operation 210 branches NO and processing of method 200 remains idle until subsequent processing is received. In examples where a selection is received through the user interface menu, decision operation 210 branches YES and processing of method 200 proceeds to processing operation 212.

At processing operation 212, the user interface of the application/service is updated based on the received selection through the user interface menu. Update to the user interface may comprise any of: updating content of the electronic document (e.g., undoing an automatically applied autocorrection); drilling through menu options of the user interface menu; toggling user interface features related to settings for application of autocorrection; viewing review insights for applied autocorrections; and launching other applications/services that may be interfacing with either an application/service component 104 (FIG. 1) and/or an autocorrect generation component 106 (FIG. 1). Processing of method 200 may then turn idle until subsequent processing is received.

FIGS. 3A-3H illustrate exemplary processing device views associated with user interface examples for an improved user interface of an application or service that is configured for management of autocorrections to an electronic document, with which aspects of the present disclosure may be practiced. FIGS. 3A-3H provide non-limiting front-end examples of processing described in the foregoing including process flow 100 (FIG. 1) and method 200 (FIG. 2).

Figure 3A:
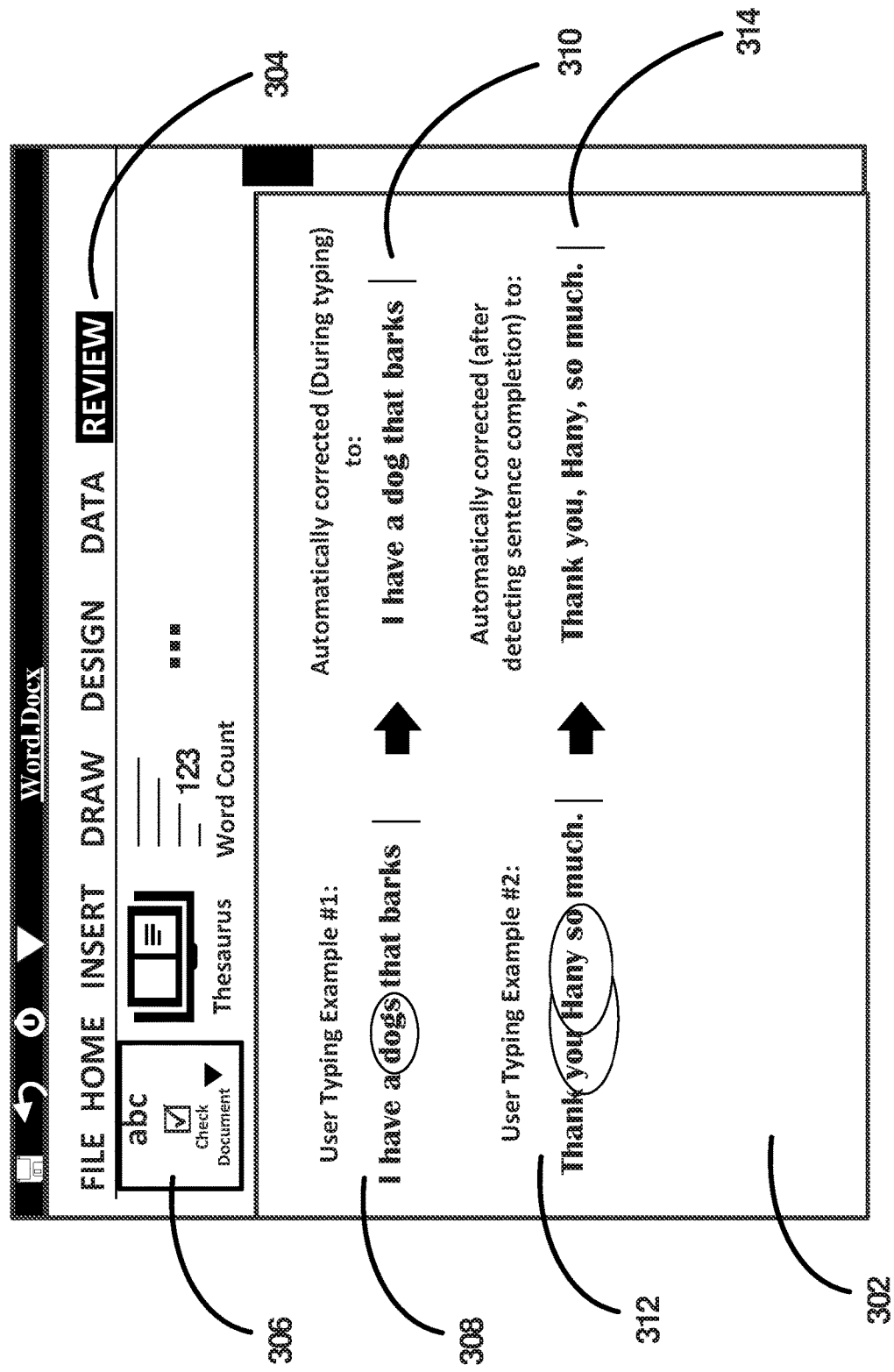

FIG. 3A presents processing device view 300, illustrating an interaction with a user, through a user computing device, and an exemplary productivity service. Processing device view 300 illustrates display of an electronic document 302 through a productivity application/service (e.g., word processing application/service). Examples shown in process device view 300 are intended to illustrate how a user interface is adapted through application of automatic autocorrection, where actual execution may simply correct a word/content portion without providing full illustrative examples. In the example shown in processing device view 300, the user is accessing an electronic document 302, where processing device view 300 illustrates contextual examples illustrating the before and after an autocorrection is automatically applied. In the first example 308, a user has a typographical error "dogs" that is detected and automatically corrected to recite "dog" in the first result example 310. The typographical error, shown in the first example 308 may be highlighted and automatically replaced as shown in the first result example 310. In doing so, a visual user interface effect may highlight the typographical error and the replacement of the typographical error. Furthermore, the visual user interface effect may reflect a classification identification of the type of autocorrection that is being applied (e.g., spelling), where users may become aware that this type of user interface effect is associated with spelling errors. The visual user interface affect may differ as compared with a visual user interface effect of a different type of autocorrection (e.g., grammar), which is reflected in the second example 312. In the first result example 310, the autocorrection may be automatically applied before the user finishes typing the sentence (e.g., adds a period for punctuation). This determination may be the result of contextual analysis through the autocorrect generation component 106.

The second examples 312 illustrates a grammatical autocorrection that results from the user not adding commas into their sentence. The typographical error, shown in the second example 312 may be highlighted and automatically replaced as shown in the second result example 314. In doing so, a visual user interface effect may highlight the typographical error and the replacement of the typographical error. In the second result example 312, the autocorrection may be automatically applied after the user finishes typing the sentence (e.g., adds a period for punctuation). This determination may be the result of contextual analysis through the autocorrect generation component 106, where it may not be clear where to add commas until the sentence is completed.

In the example shown, a user interface application command control for the word processing application/service is modified to include a user interface menu option 304 that presents user interface features to enable launch of a user interface menu providing review insights into applied autocorrections. Selection of the user interface menu option 304 may trigger update of a user interface to display a user interface feature 306 that, when selected, automatically initiates processing that launches the user interface menu providing review insights into applied autocorrections. Additionally, not illustrated therein, user interface features may be presented that enable users to toggle on/off autocorrection processing.

FIG. 3B presents processing device view 320, illustrating another example of an interaction with a user, through a user computing device, and an exemplary productivity service. In one instance, processing device 320 is a continued example, from processing device view 300 (FIG. 3A), where a user executes a selection action 324 that selects the user interface menu option 306 to initiate launch of the user interface menu providing review insights into applied autocorrections. As an example, the selection action 324 triggers update of the user interface of the word processing application/service to launch a user interface the user interface menu, for example, in a review pane provided through the user interface of the application/service. In the example shown in processing device view 320, autocorrected content 322 of the electronic document is show that has replaced typographical errors in an electronic document. A user may wish to receive review insights into applied autocorrections, for example, after seeing that autocorrections were automatically applied.

Figure 3C:
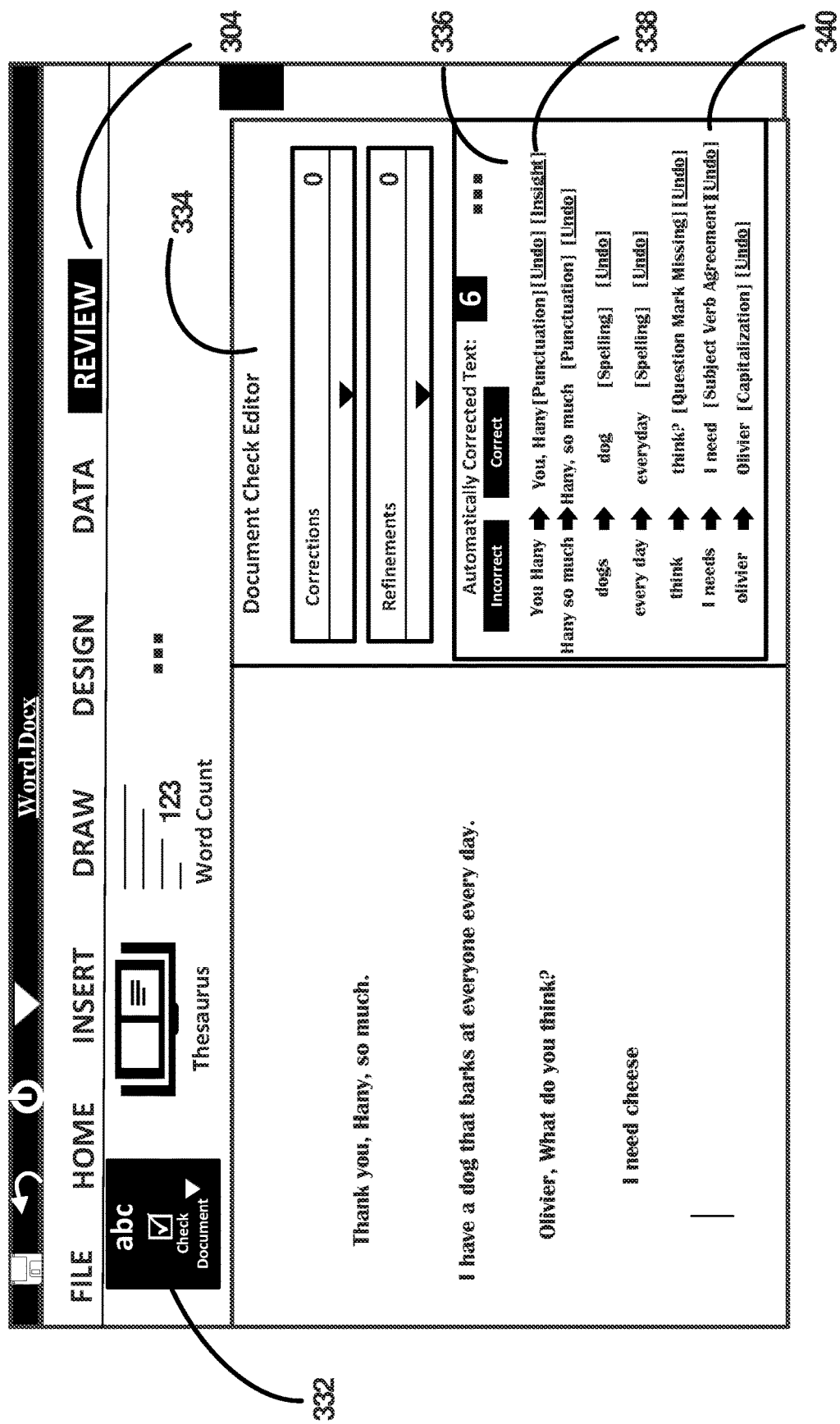

FIG. 3C presents processing device view 330, illustrating another example of an interaction with a user, through a user computing device, and an exemplary productivity service. In one instance, processing device 330 is a continued example, from processing device view 320 (FIG. 3B), where a user interface menu 334, providing review insights into applied autocorrections, is automatically presented though a user interface. Processing device view 330 illustrates selection 332 of the user interface feature 306 (where user interface feature 306 is highlighted) that is a trigger for launching of user interface menu 334, providing review insights into applied autocorrections In some examples, de-selection of user interface feature 306 may trigger automatic action that hides user interface menu 334 and de-selects user interface feature 306.

Processing device view 330 provides a visual example of a user interface menu 334, functionality of which has been previously described in the foregoing description including the description of process flow 100 (FIG. 1), method 200 (FIG. 2). Further, processing device view 330 illustrates that user interface feature 306 is selected, triggering launch of the user interface menu providing review insights into applied autocorrections. User interface menu 334 may comprise traditional review features such as identification of corrections to context (e.g., spelling) and refinement of an electronic document. Such user interface features are known to one skilled in the field of art. The user interface menu 334 is further adapted to provide a sub-menu 336 providing insights into automatically applied autocorrections. While the example shows that the user interface features are part of sub-menu 336, it is to be understood that other user interface representations may provide user interface features described herein as part of its own menu or pane, without departing from the spirit of the present disclosure. As previously described and among other types of functionality and user interface features, the user interface menu (e.g., sub-menu 336) may comprise: a listing of a state of the one or more content portions before autocorrection is applied, a listing of autocorrections automatically applied to the electronic document, a classification identification classifying a type of autocorrection for the one or more content portions, and a selectable user interface feature 340 that, when selected, is configured to automatically undo an autocorrection of the one or more content portions. Additionally, the sub-menu 336 may comprise a user interface feature 338 that, when selected, provides contextual insight into why the autocorrection was automatically applied.

Figure 3D:
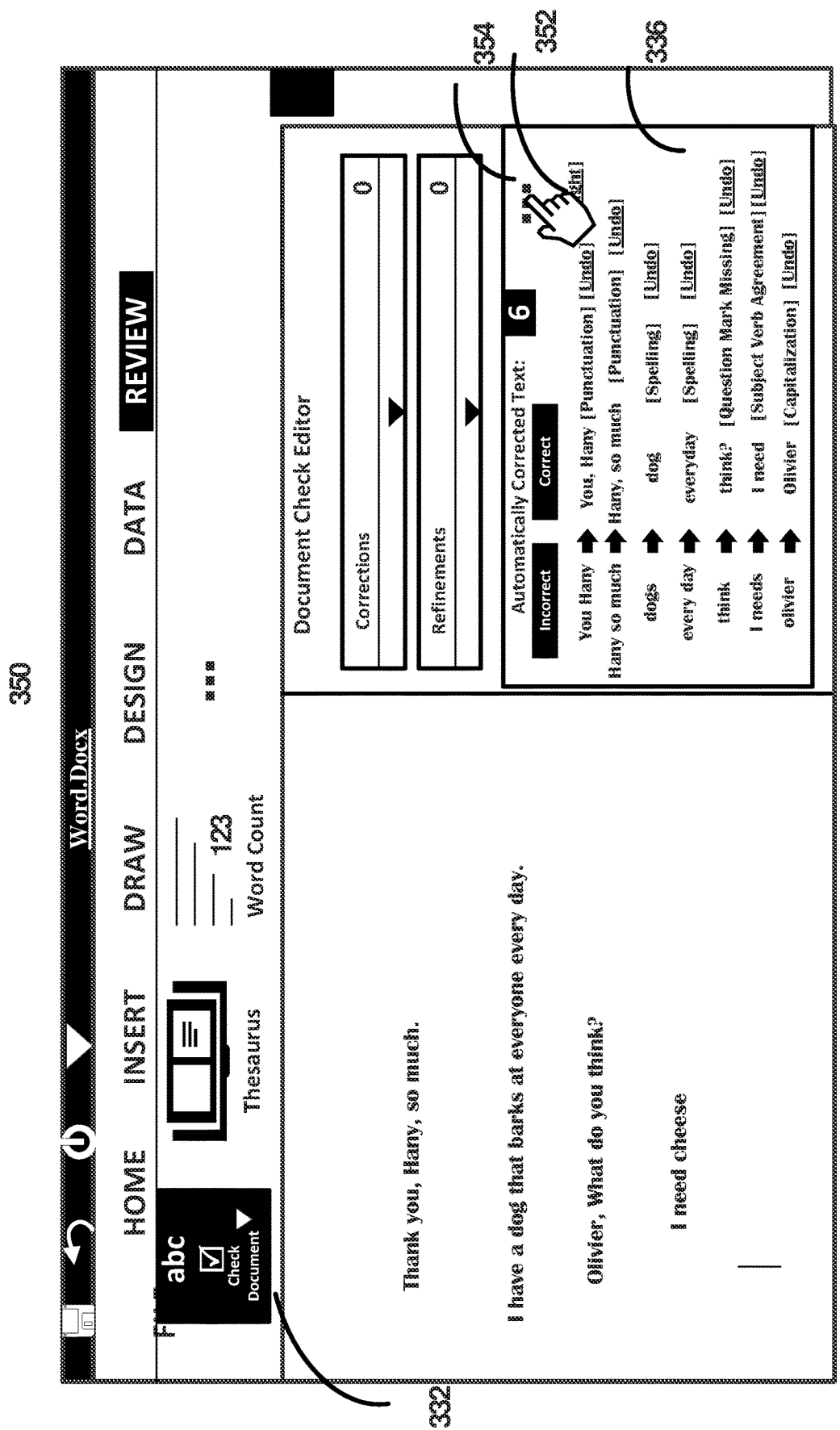

FIG. 3D presents processing device view 350, illustrating another example of an interaction with a user, through a user computing device, and an exemplary productivity service. In one instance, processing device 350 is a continued example, from processing device view 340 (FIG. 3C), illustrating user interface feature selection from the user interface menu 336 (e.g., sub-menu). In the example shown in processing device view 350, a user provides user input 352 selecting an ellipsis user interface feature 354, providing access to additional menu content provided by an adapted user interface of the application/service. This may trigger generation of an updated presentation of the user interface to provide a sub-menu of the user interface menu 336. In alternative examples, other menu-style options may be presented to access content (e.g., a drop-down of sub-menus and/or features).

Figure 3E:
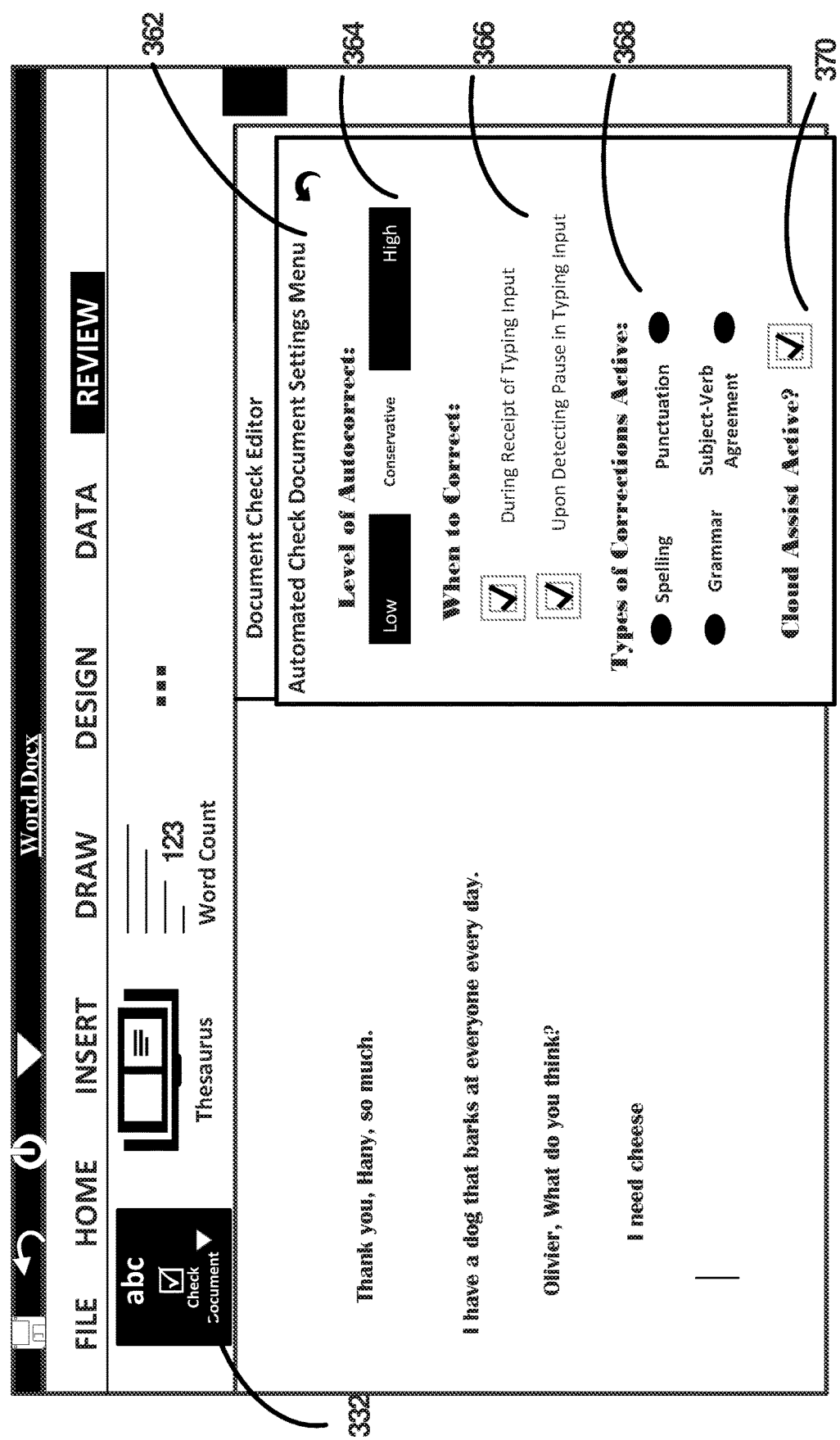

FIG. 3E presents processing device view 360, illustrating another example of an interaction with a user, through a user computing device, and an exemplary productivity service. In one instance, processing device 360 is a continued example, from processing device view 350 (FIG. 3D), where an autocorrection settings sub-menu 362 is presented. The autocorrection settings sub-menu 362 may be configured to provide user interface features enabling users to manage functionality of autocorrection processing through toggling of user interface features. As a non-limiting example, the autocorrection settings sub-menu 362 is configured to provide a user interface element 364 that enables a user to set a level of autocorrection during access to the electronic document. Functionality pertaining to user interface element 364 has been described in the foregoing description. Additionally, the autocorrection settings sub-menu 362 is configured to provide user interface features 366, which allows a user to toggle when to automatically apply an autocorrection, for example, during receipt of a typing input or upon detection of a pause/ending of a typing input. Functionality pertaining to user interface features 366 has been described in the foregoing description.

Moreover, the autocorrection settings sub-menu 362 is configured to provide user interface features 368, which provide selectable user interface features allowing a user to toggle what types of autocorrections to automatically apply. Functionality pertaining to user interface features 368 has been described in the foregoing description. The autocorrection settings sub-menu 362 is further configured to provide user interface element 370, which allows a user to toggle whether to apply cloud-based assistance for execution of autocorrection functionality. Functionality pertaining to user interface element 370 has been described in the foregoing description.

Figure 3F:
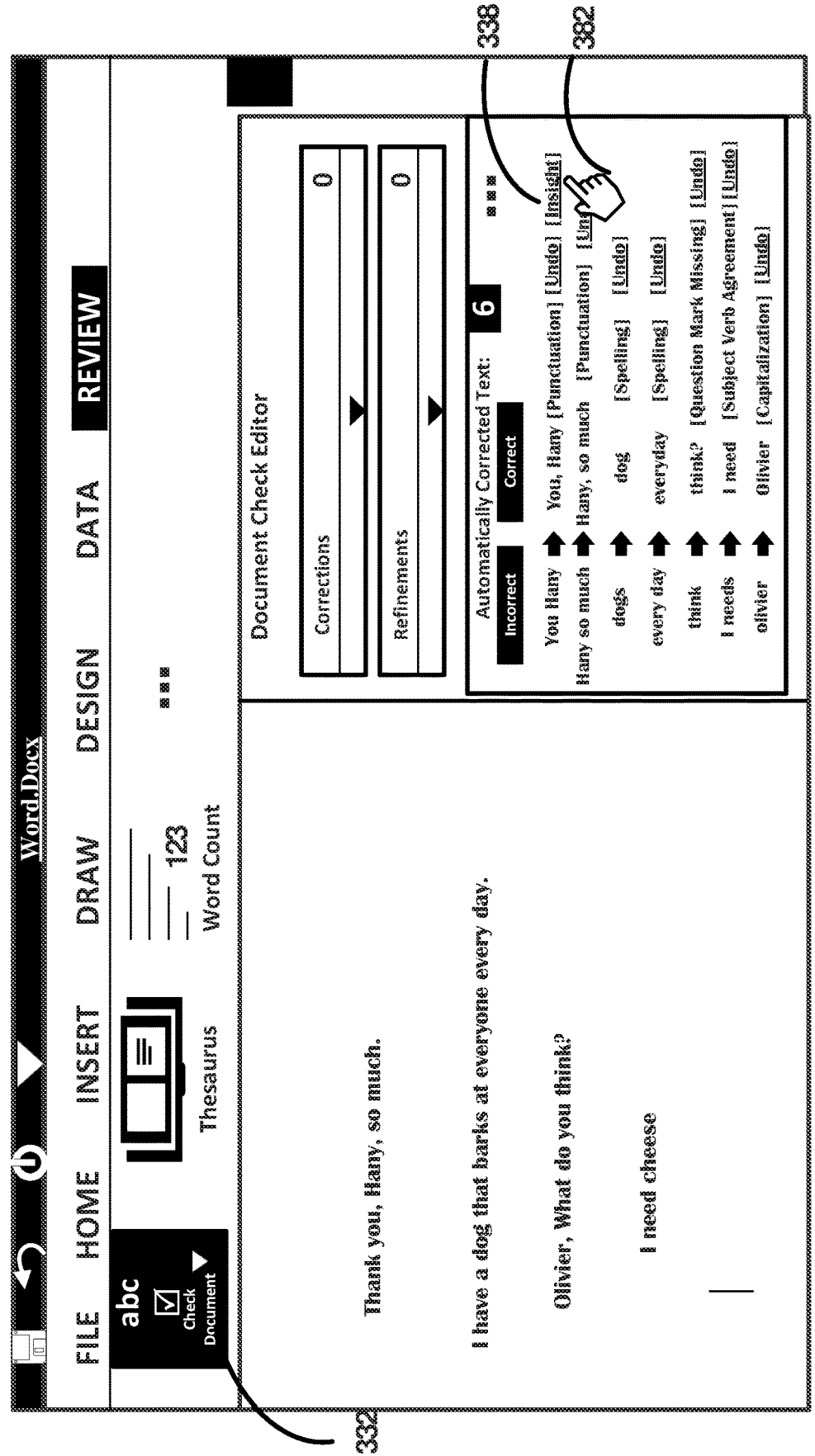

FIG. 3F presents processing device view 380, illustrating another example of an interaction with a user, through a user computing device, and an exemplary productivity service. In one instance, processing device 380 is a continued example, from processing device view 330 (FIG. 3C), where a user provides an input 382, through the user interface, selecting user interface feature 338 that, when selected, provides contextual insight into why the autocorrection was automatically applied.

Figure 3G:
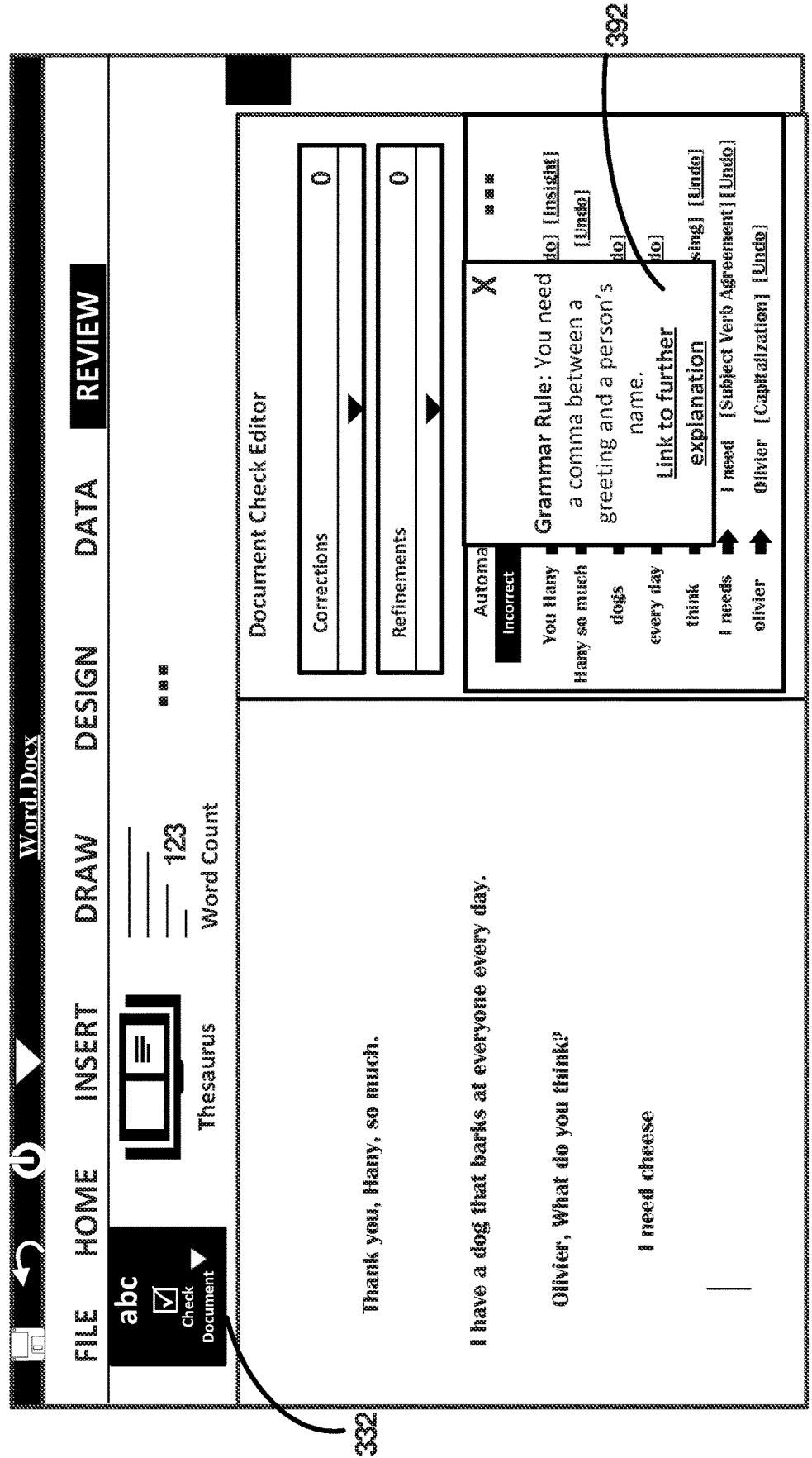

FIG. 3G presents processing device view 390, illustrating another example of an interaction with a user, through a user computing device, and an exemplary productivity service. In one instance, processing device 390 is a continued example, from processing device view 380 (FIG. 3F), where the received input 382 triggers automated launch of a user interface callout 392 providing review insight into why a specific autocorrection was automatically applied.

Figure 3H:
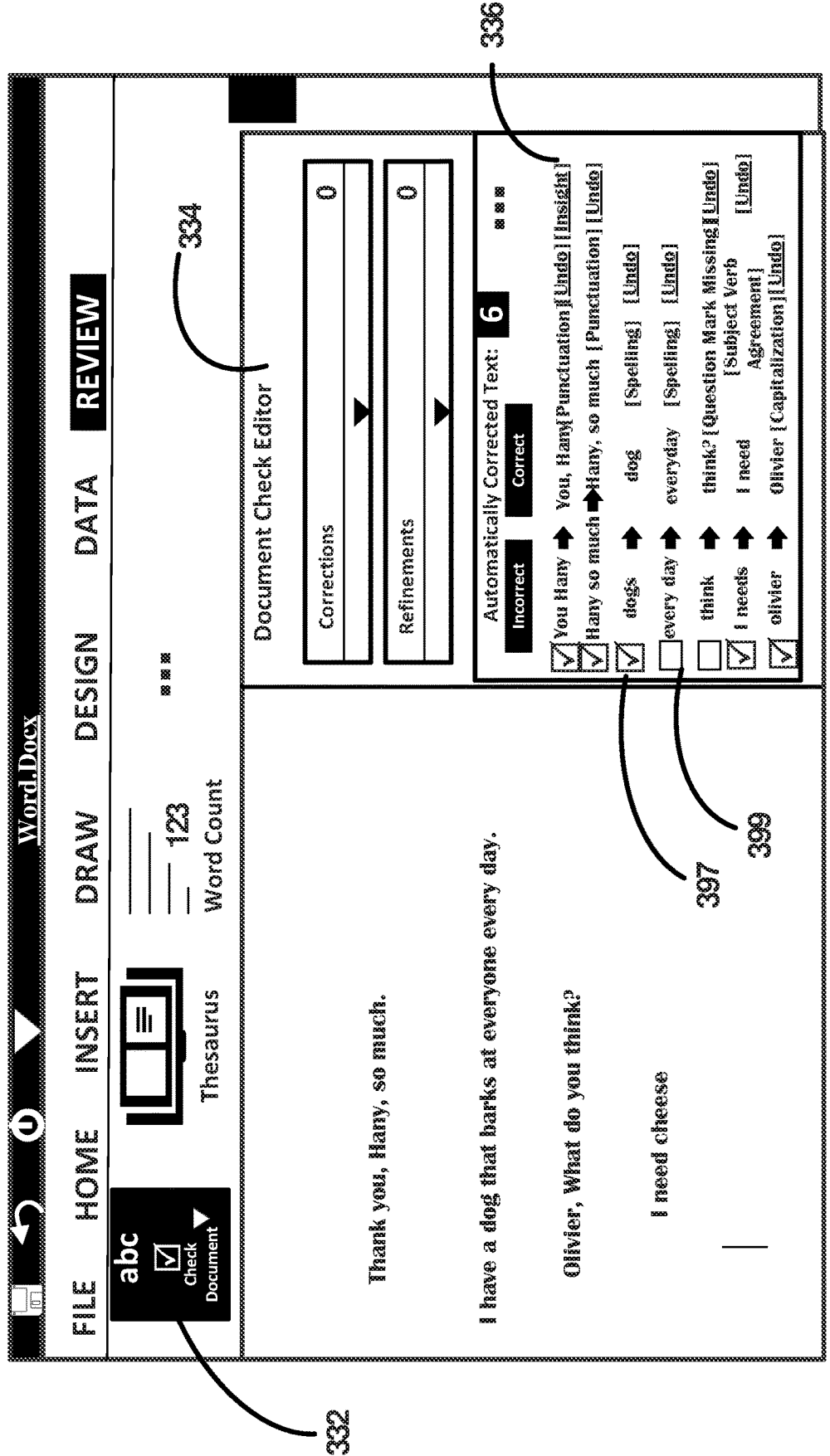

FIG. 3H presents processing device view 395, illustrating an alternative representation of the user interface menu 334 and sub-menu 336. In the example shown in processing device view 395, the sub-menu 336 provides selected user interface features 397 identifying automatically applied autocorrections as well as selectable user interface features for candidate autocorrect suggestions 399 that, when selected, may trigger automated application of such autocorrections. Processing to determine whether to automatically apply autocorrections and/or present autocorrection suggestions may be determined based on the contextual processing described in the foregoing description including the description of process flow 100 (FIG. 1) and method 200 (FIG. 2).

FIG. 4 illustrates a computing system 401 suitable for implementing processing operations described herein related to management of autocorrection processing and associated user interface generation, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components 406 that are configured as relevance suggestion component (s) executing processing operations as described herein including identification and presentation of contextually relevant productivity features for user access to an electronic document. In some examples, computing system 401 may be a device that a user utilizes to access an application/service in which contextually relevant suggestions are surfaced. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute exemplary process flow 100 (FIG. 1) including processing of associated components as well as methods 200 (FIG. 2), where processing operations may be specifically executed that are related to data transformation and presentation of content such as the content is tailored for presentation in a different application/service, as described in the foregoing description.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for autocorrect generation components 406a, application/service components 406b (e.g., of a software application platform), and other service-based components, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:

detecting one or more content portions for autocorrection in an electronic document that is presented through a user interface of an application or service;

generating a classification identification classifying a type of correction to be executed for the one or more content portions;

selecting a timing as when to apply an autocorrection for the correction by applying a trained machine learning model adapted to select when to apply the autocorrection based on a collective analysis of:
the classification identification,
a determined location of the one or more content portions within one or more sentences of the electronic document, and
confidence scoring adapted to determine whether to apply the autocorrection during a receipt of typing input based on analysis of the classification identification and the determined location;

automatically applying, at the timing selected in the selecting, the autocorrection to the one or more content portions in the electronic document; and presenting a user interface menu comprising a graphical user interface feature identifying a list of autocorrections automatically applied to the electronic document, wherein each autocorrection in the list of autocorrections is presented and prioritized in the user interface menu based on the confidence scoring, and wherein the autocorrections that have a confidence score that exceeded a threshold value by less than a specific value are positioned higher in the list of autocorrections than autocorrections that have a confidence score that exceeded the threshold value by more than the specific value.

2. The method of claim 1, wherein the detecting of the one or more content portions for autocorrection comprises: generating confidence scoring for candidate autocorrections of the one or more content portions for autocorrection, and selecting a candidate autocorrection based on analysis of the confidence scoring for candidate autocorrections.

3. The method of claim 1, wherein the selecting of the timing as when to apply the autocorrection for the correction comprises: determining that the autocorrection for the one or more content portions is to be applied after a pause in typing input is detected based on a result of the collective analysis, and wherein the automatically applying of the autocorrection comprises detecting that the pause in typing input satisfies a predetermined time interval.

4. The method of claim 1, wherein the selecting of the timing as when to apply the autocorrection for the correction comprises: determining that the autocorrection for the one or more content portions for autocorrection is to be applied during a receipt of a typing input based on a result of the collective analysis.

5. The method of claim 1, further comprising automatically presenting a sub-menu that comprises one or more selectable graphical user interface features enabling a user to manually toggle a timing as to when autocorrection is to be applied relative to a receipt of a typing input.

6. The method of claim 1, wherein the applying of the trained machine learning model applies a ranker to generate the confidence scoring adapted to determine whether to apply the autocorrection during a receipt of typing input.

7. The method of claim 1, wherein the type of correction of each autocorrection triggers presentation of the autocorrection with a specific type of graphical user interface effect during implementation of the autocorrection.

8. A system comprising:
at least one processor; and
a memory, operatively connected with the at least one processor, storing computer-executable instructions that, when executed by the at least one processor, causes the at least one processor to execute a method that comprises:
- detecting one or more content portions for autocorrection in an electronic document that is presented through a user interface of an application or service;
- generating a classification identification classifying a type of correction to be executed for the one or more content portions;
- selecting a timing as when to apply an autocorrection for the correction by applying a trained machine learning model adapted to select when to apply the autocorrection based on a collective analysis of:
  - the classification identification,
    - a determined location of the one or more content portions within one or more sentences of the electronic document, and
    - confidence scoring adapted to determine whether to apply the autocorrection during a receipt of typing input based on analysis of the classification identification and the determined location;
- automatically applying, at the timing selected in the selecting, the autocorrection to the one or more content portions in the electronic document; and
- presenting a user interface menu comprising a graphical user interface feature identifying a list of autocorrections automatically applied to the electronic document, wherein each autocorrection in the list of autocorrections is presented and prioritized in the user interface menu based on the confidence scoring, and wherein the autocorrections that have a confidence score that exceeded a threshold value by less than a specific value are positioned higher in the list of autocorrections than autocorrections that have a confidence score that exceeded the threshold value by more than the specific value.

9. The system of claim 8, wherein the detecting of the one or more content portions for autocorrection comprises: generating confidence scoring for candidate autocorrections of the one or more content portions for autocorrection, and selecting a candidate autocorrection based on analysis of the confidence scoring for candidate autocorrections.

10. The system of claim 8, wherein the selecting of the timing as when to apply the autocorrection for the correction comprises: determining that the autocorrection for the one or more content portions is to be applied after a pause in typing input is detected based on a result of the collective analysis, and wherein the automatically applying of the autocorrection comprises detecting that the pause in typing input satisfies a predetermined time interval.

11. The system of claim 8, wherein the selecting of the timing as when to apply the autocorrection for the correction comprises: determining that the autocorrection for the one or more content portions for autocorrection is to be applied during a receipt of a typing input based on a result of the collective analysis.

12. The system of claim 8, wherein the presenting of the user interface menu further comprises: automatically presenting a sub-menu that comprises one or more selectable graphical user interface features enabling a user to manually toggle a timing as to when autocorrection is to be applied relative to a receipt of a typing input.

13. The system of claim 8, wherein the applying of the trained machine learning model applies a ranker to generate the confidence scoring adapted to determine whether to apply the autocorrection during a receipt of typing input.

14. The system of claim 8, wherein the type of correction of each autocorrection triggers presentation of the autocorrection with a specific type of graphical user interface effect during implementation of the autocorrection.

15. A method comprising:
- detecting, on a server device, one or more content portions for autocorrection in an electronic document;
- generating a classification identification classifying a type of correction to be executed for the one or more content portions;
- selecting a timing as when to apply an autocorrection for the correction by applying a trained machine learning model adapted to select when to apply the autocorrection based on a collective analysis of:
  - the classification identification,
    - a determined location of the one or more content portions within one or more sentences of the electronic document, and
    - confidence scoring adapted to determine whether to apply the autocorrection during a receipt of typing input based on analysis of the classification identification and the determined location;
- automatically generating, at the timing selected in the selecting, the autocorrection to the one or more content portions in the electronic document; and
- causing a user interface menu comprising a graphical user interface feature identifying a list of autocorrections automatically applied to the electronic document to be presented, wherein each autocorrection in the list of autocorrections is caused to be presented and prioritized in the user interface menu based on the confidence scoring, and wherein the autocorrections that have a confidence score that exceeded a threshold value by less than a specific value are positioned higher in the list of autocorrections than autocorrections that have a confidence score that exceeded the threshold value by more than the specific value.

16. The method of claim 15, wherein the applying of the trained machine learning model applies a ranker to generate the confidence scoring adapted to determine whether to apply the autocorrection during a receipt of typing input.

17. The method of claim 15, wherein the detecting of the one or more content portions for autocorrection comprises: generating confidence scoring for candidate autocorrections of the one or more content portions for autocorrection, and selecting a candidate autocorrection based on analysis of the confidence scoring for candidate autocorrections.

18. The method of claim 15, wherein the selecting of the timing as when to apply the autocorrection for the correction comprises: determining that the autocorrection for the one or more content portions is to be applied after a pause in typing input is detected based on a result of the collective analysis, and wherein the automatically applying of the autocorrection comprises detecting that the pause in typing input satisfies a predetermined time interval.

19. The method of claim 15, wherein the selecting of the timing as when to apply the autocorrection for the correction comprises: determining that the autocorrection for the one or more content portions for autocorrection is to be applied during a receipt of a typing input based on a result of the collective analysis.

20. The method of claim 15, wherein the type of correction of each autocorrection triggers presentation of the autocorrection with a specific type of graphical user interface effect during implementation of the autocorrection.

* * * * *